(12) United States Patent
Choi

(10) Patent No.: US 10,685,492 B2
(45) Date of Patent: Jun. 16, 2020

(54) SWITCHABLE VIRTUAL REALITY AND AUGMENTED/MIXED REALITY DISPLAY DEVICE, AND LIGHT FIELD METHODS

(71) Applicant: Choi Enterprise, LLC, Provo, UT (US)

(72) Inventor: Joseph S. Choi, Cypress, CA (US)

(73) Assignee: Choi Enterprise, LLC, Provo, UT (US)

( * ) Notice: Subject to any disclaimer, the term of this patent is extended or adjusted under 35 U.S.C. 154(b) by 46 days.

(21) Appl. No.: 15/852,752

(22) Filed: Dec. 22, 2017

(65) Prior Publication Data
US 2018/0182174 A1 Jun. 28, 2018

Related U.S. Application Data

(60) Provisional application No. 62/437,817, filed on Dec. 22, 2016.

(51) Int. Cl.
*G06T 19/00* (2011.01)
*G02B 26/08* (2006.01)
(Continued)

(52) U.S. Cl.
CPC ........ *G06T 19/006* (2013.01); *G02B 26/0833* (2013.01); *G02B 26/101* (2013.01);
(Continued)

(58) Field of Classification Search
CPC ........ G02B 27/2214; G02B 2027/0134; G02B 2027/0138; G02B 26/0833; G02B 26/101;
(Continued)

(56) References Cited

U.S. PATENT DOCUMENTS 5,220,631 A 6/1993 Grippin
9,557,547 B2 1/2017 Choi et al.
(Continued)

FOREIGN PATENT DOCUMENTS

WO 2014024121 A1 2/2014
WO 2017/007526 A2 1/2017
WO WO-2018076727 A1 * 5/2018 ......... G02B 27/0172

OTHER PUBLICATIONS

Kelly, Kevin.: "The Untold Story of Magic Leap, the World's Most Secretive Startup". Wired. (May 2016).
(Continued)

*Primary Examiner* — Anner N Holder
(74) *Attorney, Agent, or Firm* — Andrew J. Anderson, Esq.; Harter Secrest & Emery LLP

(57) ABSTRACT

Designs useful for switchable "Virtual Reality," "Augmented Reality," and "Mixed Reality" (VR/AR/MR) devices, for combining real reality and simulated reality images, other display purposes, and more. Various methods are proposed to combine (or not) real reality with simulated reality through the use of some level of zooming, cloaking, and/or other techniques. This enables a switchable VR and AR/MR system that does not require transparent glasses or devices. Various systems and methods are presented, some that can be generalized to novel imaging and display techniques that have broad applications beyond VR, AR, MR and other fields.

19 Claims, 7 Drawing Sheets

Figure 1:
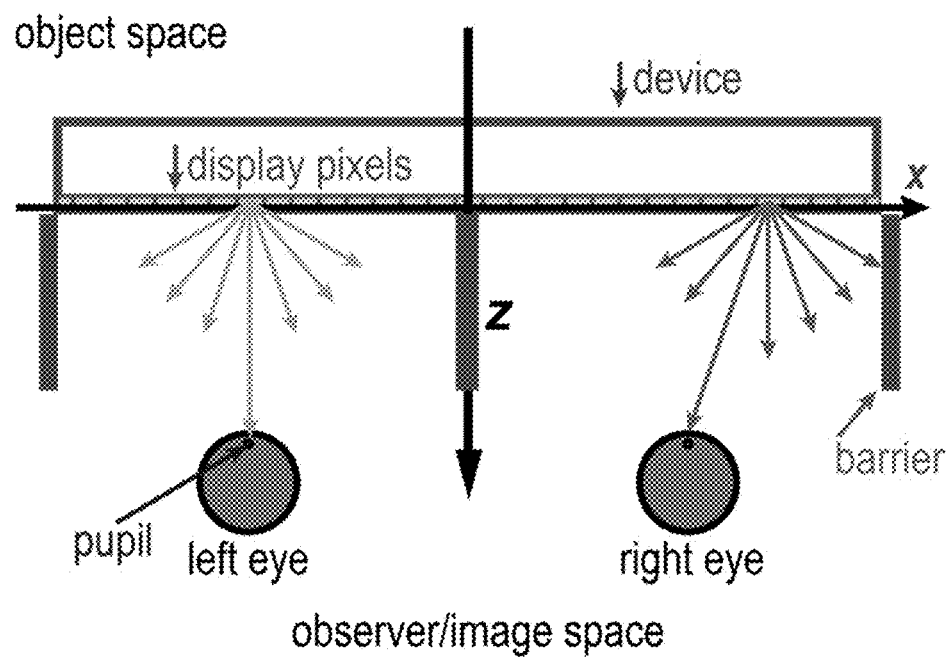

(51) Int. Cl.
| | |
|---|---|
| G02B 26/10 | (2006.01) |
| G02B 27/00 | (2006.01) |
| G02B 27/01 | (2006.01) |
| G02B 30/27 | (2020.01) |
| H04N 13/239 | (2018.01) |
| H04N 13/305 | (2018.01) |
| H04N 13/307 | (2018.01) |
| H04N 13/344 | (2018.01) |
| H04N 13/398 | (2018.01) |
| H04N 13/365 | (2018.01) |

(52) U.S. Cl.
CPC ..... *G02B 27/0075* (2013.01); *G02B 27/0172* (2013.01); *G02B 30/27* (2020.01); *H04N 13/239* (2018.05); *H04N 13/305* (2018.05); *H04N 13/307* (2018.05); *H04N 13/344* (2018.05); *H04N 13/365* (2018.05); *H04N 13/398* (2018.05); *G02B 2027/0134* (2013.01); *G02B 2027/0138* (2013.01); *H04N 2213/001* (2013.01); *H04N 2213/008* (2013.01)

(58) Field of Classification Search
CPC ............ G02B 27/0075; G02B 27/0172; G06T 19/006; H04N 2213/008; H04N 13/0239; H04N 13/0404; H04N 13/0427; H04N 13/0459; H04N 13/0497; H04N 13/239; H04N 13/305; H04N 13/307; H04N 13/344; H04N 13/365; H04N 13/398
See application file for complete search history.

(56) References Cited

U.S. PATENT DOCUMENTS

| | | | | |
|---|---|---|---|---|
| 2002/0117605 | A1* | 8/2002 | Alden | F41H 3/00 250/208.1 |
| 2008/0143953 | A1* | 6/2008 | Welchel | A41D 13/1184 351/62 |
| 2014/0157496 | A1* | 6/2014 | Ginther | A61F 9/025 2/439 |
| 2015/0206343 | A1* | 7/2015 | Mattila | G06T 17/05 345/420 |
| 2016/0025956 | A1 | 1/2016 | Choi et al. | |
| 2016/0131908 | A1* | 5/2016 | Fateh | G06F 3/147 345/633 |
| 2016/0363776 | A1* | 12/2016 | Zhong | G02B 5/10 |
| 2017/0039907 | A1* | 2/2017 | Jepsen | G02B 27/0172 |
| 2017/0256197 | A1* | 9/2017 | Goslin | G02B 27/022 |
| 2017/0281412 | A1* | 10/2017 | Hess | A61H 5/00 |
| 2017/0323482 | A1* | 11/2017 | Coup | A63G 7/00 |
| 2018/0004481 | A1* | 1/2018 | Fallon | G06F 3/012 |
| 2018/0005441 | A1* | 1/2018 | Anderson | A63F 13/655 |
| 2018/0052326 | A1* | 2/2018 | Wall | H04N 13/344 |
| 2018/0052584 | A1 | 2/2018 | Choi et al. | |
| 2018/0203505 | A1* | 7/2018 | Trail | G06F 3/013 |
| 2018/0292179 | A1 | 10/2018 | Choi et al. | |

OTHER PUBLICATIONS

Cakmakci, Ozan et al.: "Head-Worn Displays: A Review". Journal of Display Technology, vol. 2, No. 3. (Sep. 2006).
Kress, Bernard et al.: "A review of head-mounted displays (HMD) technologies and applications for consumer electronics". Google Inc. (2013).
"Google Cardboard for Manufacturers". Specifications & Tolerance Guide.
Greivenkamp, J. E.: "Field guide to Geometrical Optics". SPIE Field Guides, vol. FG01, Bellingham, WA, USA. (2004).
Lam, Edmund Y.: "Computational photography with plenoptic camera and light field capture: tutorial". Journal of the Optical Society of American. (Nov. 2015).
Wetzstein, G. et al.: in ACM SIG- GRAPH. ACM SIGGRAPH Course Notes. (2012).
Pendry, J.B. et al.: "Controlling Electromagnetic Fields". American Association for the Advancement of Science. vol. 312. (Jun. 23, 2006).
Leonhardt, Ulf.: "Optical Conformal Mapping". American Association for the Advancement of Science. vol. 312. (Jun. 23, 2006).
Choi, J.S. et al.: "Paraxial ray optics cloaking". The Institute of Optics, University of Rochester. Optical Society of America. (2014).
Choi, J.S. et al.: "Digital intergral cloaking". Optica, vol. 3 No. 5, 536 (May 2016).
Lanman, Douglas et al.: "Near-Eye Light Field Displays". ACM Transactions on Graphics, vol. 32 No. 6 Article 220. (Nov. 2013).
Kim, Se-Um, et al.: "Concept of active parallax barrier on polarizing interlayer for near-viewing autostereoscopic displays". Optics Express 24, 25010 (2016).
Lippmann: "Integral Photography". Scientific American 105, 164 (1911).
Ng, R., et al.: "Light Field Photography with a Hand-held Plenoptic Camera". Stanford University Computer Science Tech Report CSTR Feb. 2005 (2005).
Hornbeck, L. J.: "Digital Light Processing and MEMS: Timely Convergence for a Bright Future". Micromachining and Microfabrication Process Technology, vol. 2639 (Proceedings SPIE, 1995) p. 2.
Monk, David et al.: "The Digital Micromirror Device for Projection Display". Microelectronic Engineering 27, 489 (1995).
Lee, Benjamin, "DMD 101: Introduction to Digital Micromirror Device (DMD) Technology". Application Report, Texas Instrument. (2013).
Gong, C.: "The Journey of the DMD Pixel Design Evolution". ECS Transactions 60, 1141. Texas Christian University. (2014).

* cited by examiner

Figure 5(a)
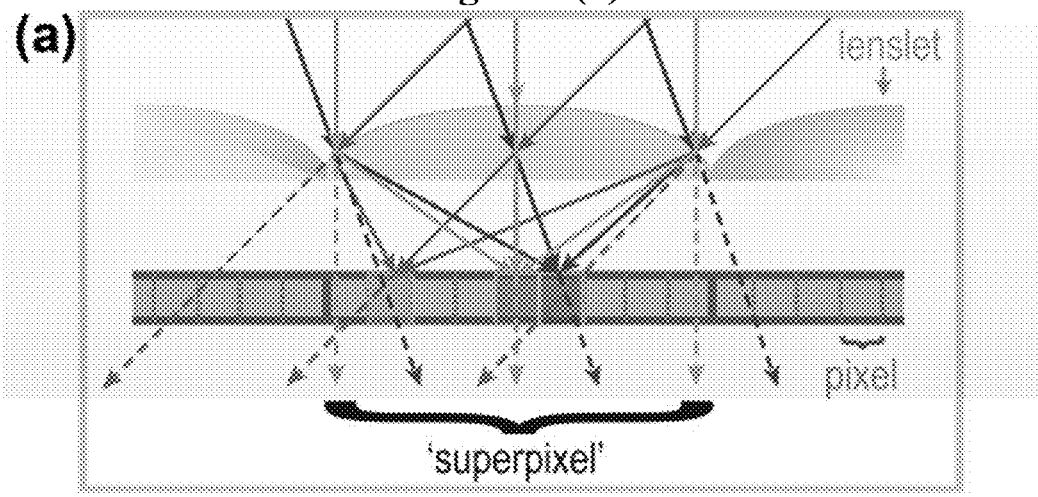
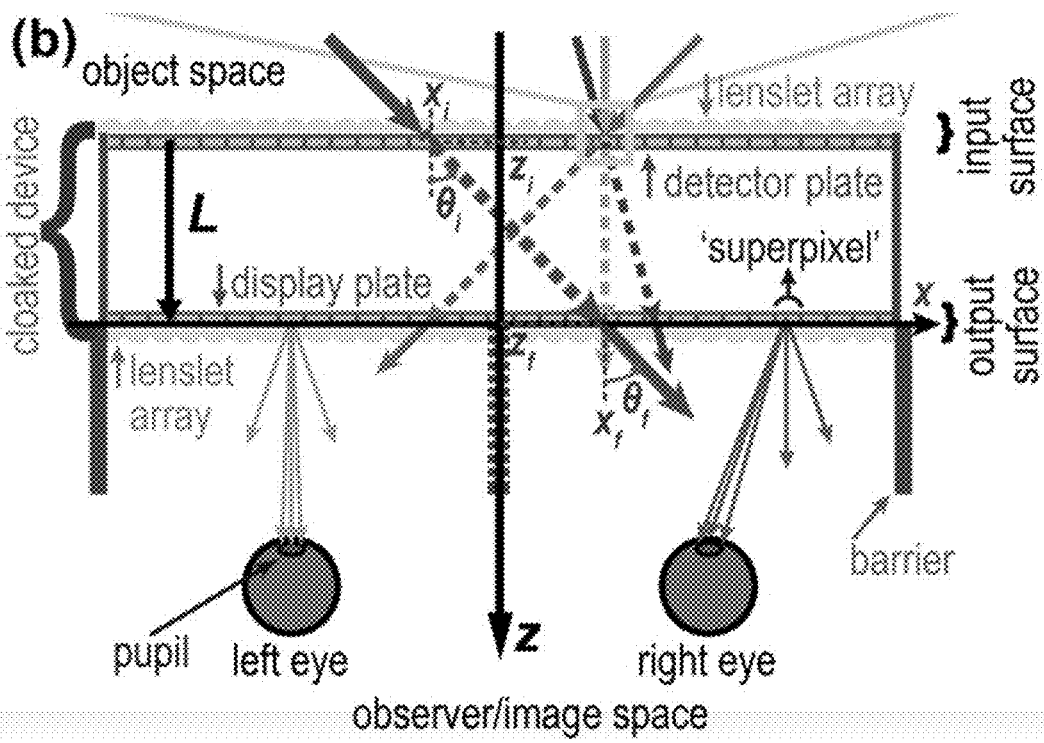
Figure 5(b)

Figure 7(a)
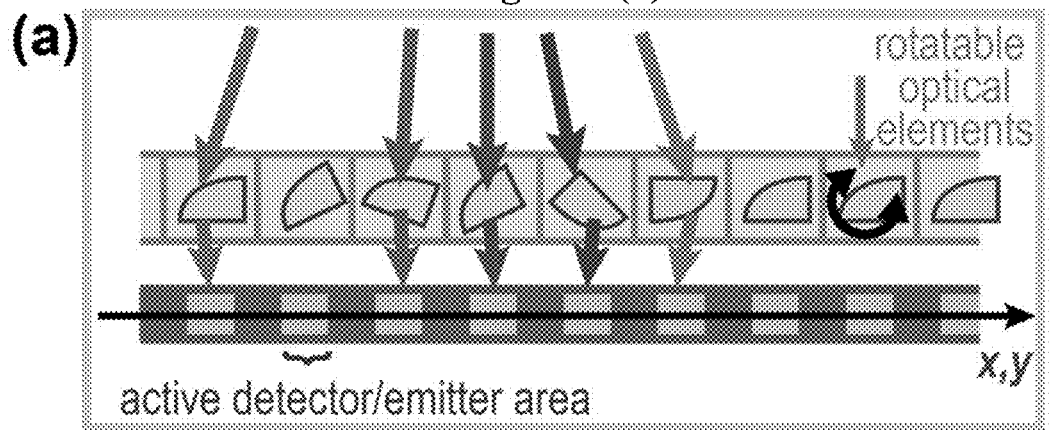
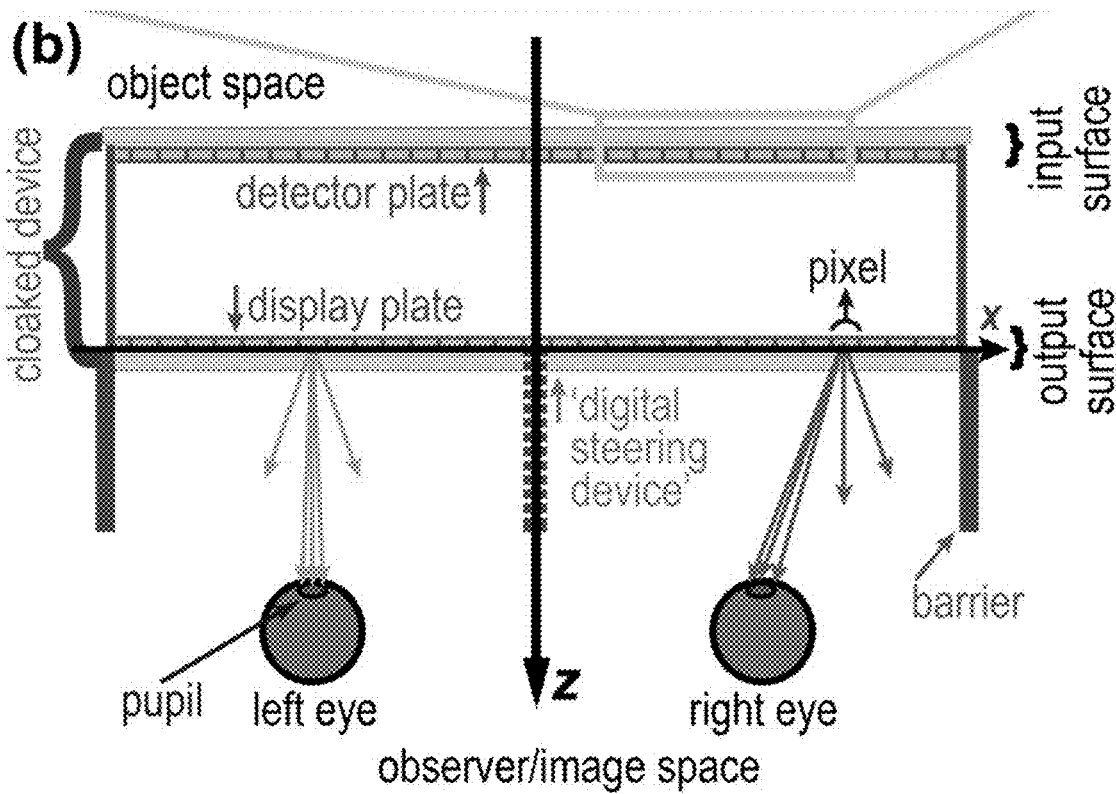
Figure 7(b)

SWITCHABLE VIRTUAL REALITY AND AUGMENTED/MIXED REALITY DISPLAY DEVICE, AND LIGHT FIELD METHODS

CROSS-REFERENCE TO RELATED APPLICATIONS

This application claims the benefit of U.S. provisional application Ser. No. 62/437,817 filed Dec. 22, 2016, the disclosure of which is incorporated herein by reference in its entirety.

TECHNICAL FIELD

The disclosure relates to the field of virtual and augmented/mixed reality display devices and methods, and more particularly to a switchable virtual and augmented/mixed reality display system.

BACKGROUND

"Virtual Reality" (VR), "Augmented Reality" (AR), "Mixed Reality" (MR) and others incorporate simulated worlds with or without some portion of the real world of the user. VR creates a virtual world, different than the real world, that is presented to the observer; in AR, simulated object(s) are overlaid ('augmented') onto the real world; and in MR the virtual or simulated world is 'mixed' with the real world to present a combined world [1]. For this disclosure, VR, AR, and MR, and other simulated content will be called simulated reality (SR), while that of the real world will be called real reality (RR). Some of the companies working on such SR devices include Facebook Oculus, Microsoft Hololens, Magic Leap, Vuzix, Google, Samsung, etc. Many of these, if not all, devices are head-mounted displays (HMD) with a history of designs and applications that include the military, commercial, and consumer space [2,3].

VR devices, such as those by Samsung or Oculus, typically display two stereoscopic images (dynamic or static), one image to each eye, at a time. Most, if not all, VR devices do not allow users to see through the device as they are not transparent. However, some use detection schemes to then add on some level of simulated images of the environment of the user. Also, lenses are usually placed between the images and eyes to allow the eyes to focus on the images as if they appear from a far distance ("infinity" in optical terms) [4]. Google glasses and similar devices incorporate AR by displaying graphics on to the glasses worn by the user [3]. Magic Leap and Microsoft Hololens use MR, where users can interact with the simulated content that is incorporated in with the real world, with the real world (or portions of it) still being visible. Most, if not all, AR or MR devices, and the likes, incorporate the reality of the user through transparent devices, so the user can see the real environment directly.

The concept of a "light field" is important in describing light for image capturing and display purposes. Light is an electromagnetic wave that oscillates in time, or a combination of multiple waves. At a given point in time, each 'component' of light can be described by its color (frequency), amount/strength (irradiance), position, direction, and phase. Since human eyes cannot observe the 'phase' of visible light waves, ignoring this allows us to describe light as rays and simplifies the calculation of light propagation [5]. In particular, for a given time, a light ray can be described by its position and direction, together with its color and irradiance. This is called a 'light field' and collection of light fields can allow for 3D images to be captured and displayed [6]. To simplify discussion in this disclosure, we will assume that the color and irradiance of a light field is known (which can be measured with detectors such as those in cameras), and simply use its direction and position to describe the light field.

Some research and development of three-dimensional (3D) light capturing and display have looked into capturing and using light fields, together with computational imaging and post-processing calculations and effects [7]. Light field ideas predate many of the recent research and developments in this field, but with increased computational power and engineering, the quality and capabilities have become more practical than before. Even groups working in the VR, AR, or MR fields have begun to investigate using light fields, including Magic Leap [1].

SUMMARY

In this disclosure, various designs are described that can be useful for switchable VR/AR/MR devices, combining real reality and simulated reality, other display purposes, and more. Various methods are proposed to combine (or not) real reality with simulated reality through the use of some level of zooming, cloaking, and/or other techniques. This enables a switchable VR and AR/MR system that does not require transparent glasses or devices. Various systems and methods are presented, some that can be generalized to novel imaging and display techniques that have broad applications beyond VR, AR, MR and other fields.

A first embodiment of the disclosure is directed towards a switchable VR/AR/MR display device, comprising two digital cameras positioned for detecting left and right stereoscopic reality images, and a digital image display positioned for displaying the detected left and right stereoscopic reality images to the left and right eyes of a user of the device. In accordance with various further disclosed embodiments, the switchable VR/AR/MR display device may further include one or more of the following features: may comprise a physical barrier positioned to prevent left and right eye stereoscopic images displayed on the digital image display from being seen by the opposite eye of a user of the device; the physical barrier may be detachable from the device; may further comprise optical elements positioned to adjust the focal point of an image displayed on the digital image display relative to the eyes of a user of the device; the two cameras may be placed, or be adjustable, to be separated by approximately the interpupillary distance of the eyes of a user of the device; reality images detected by the digital cameras may be combinable with simulated images for display on the digital image display to the eyes of a user of the device; and the device may be a head mounted display device further comprising a frame for mounting the digital cameras and digital image display on the head of a user of the device.

A further embodiment of the disclosure is directed towards a switchable VR/AR/MR light field display device, comprising a light field ray detector surface positioned for capturing reality image light field rays, and a digital image display positioned for displaying light field rays corresponding to the captured reality image light field rays to the eyes of a user of the device. In accordance with various further disclosed embodiments, the switchable VR/AR/MR light field display device may further include one or more of the following features: may further comprise computer programming instructions stored in memory and operable for digitally cloaking the device to the eyes of a user of the device, such that input reality image light field rays captured by the detector surface are converted to output light field rays displayed by the digital image display which appear to a user of the device to have travelled in straight lines from the input reality image light field rays; the light field ray detector surface and the digital image display may comprise generally planar surfaces; at least one of the light field ray detector surface and the digital image display may comprise a curved surface; each of the light field ray detector surface and the digital image display may comprise a curved surface; at least one of the light field ray detector surface and the digital image display may comprise a lenslet array; may further comprising controllable rotatable optical elements for sequentially steering reality image light field rays from multiple different angles to same individual detectors of the detector surface, and computer programming instructions stored in memory and operable for combining detected light from different angles to obtain a temporally integrated light field; the digital image display may further comprise controllable rotatable optical elements for sequentially steering display image light field rays in multiple different angles from individual pixels of the digital image display for projecting a temporally integrated light field to the eyes of a user of the device; may further comprise at least one digital image projector and wherein the digital image display comprises digital micromirror devices with controllable pixels for sequentially reflecting light from the digital image projector at multiple different angles from individual pixels for projecting a temporally integrated light field to the eyes of a user of the device; the digital image display may comprise a first part for sending output light fields to one eye pupil of a user of the device, and a second part for sending output light fields to the other eye pupil of a user of the device; the digital image display may comprise at least a part for sending output light fields to both eye pupils of a user of the device; a portion of the digital image display may send higher resolution light field rays to the central region of an eye pupil of a user of the device, and another portion of the digital image display may send lower resolution light fields to non-central regions of an eye pupil of a user of the device; the light field ray detector surface may be configured to collect only those reality image light field rays necessary for display on the digital image display; the digital image display may send output light fields to multiple points throughout the displayed field-of-view; and the device may be a head mounted display device further comprising a frame for mounting the light field ray detector surface and digital image display on the head of a user of the device.

A further embodiment of the disclosure is directed towards a light field detector comprising a digital light sensor array detector surface and controllable rotatable optical elements for sequentially steering image light field rays from multiple different angles to same individual detectors of the detector surface, and computer programming instructions stored in memory and operable for combining detected light from different angles to obtain a temporally integrated light field.

A further embodiment of the disclosure is directed towards a light field projector comprising a digital image display and controllable rotatable optical elements for sequentially steering display image light field rays in multiple different angles from individual pixels of the digital image display for projecting a temporally integrated light field.

A further embodiment of the disclosure is directed towards a light field projector comprising at least one digital image projector and a digital image display comprises digital micromirror devices with controllable pixels for sequentially reflecting light from the digital image projector at multiple different angles from individual pixels for projecting a temporally integrated light field.

A further embodiment of the disclosure is directed towards a light field projector system for displaying a light field image to an observer, comprising at least one digital image projector, a first intermediate reflecting surface comprising digital micromirror devices with controllable pixels for sequentially reflecting light from the digital image projector at multiple different angles from individual pixels for projecting a temporally integrated light field, and a second reflecting surface for reflecting the temporally integrated light field to an observer, wherein the first intermediate reflecting surface comprises a relatively smaller total reflecting area than reflecting area of the second reflecting surface.

BRIEF DESCRIPTION OF THE DRAWING FIGURES

FIG. 1 is a schematic illustration of Design 1: VR for point-like pupil and point-like pixel approximation. For this approximation, only a single ray (the longer arrow) from each pixel enters the pupil. Thus, a flat display screen that emits rays of light in all directions in front of it, still acts like a 'light field' display. Barriers can be used to block unwanted rays, if desired. (Only a few example rays are drawn.)

Figure 2:
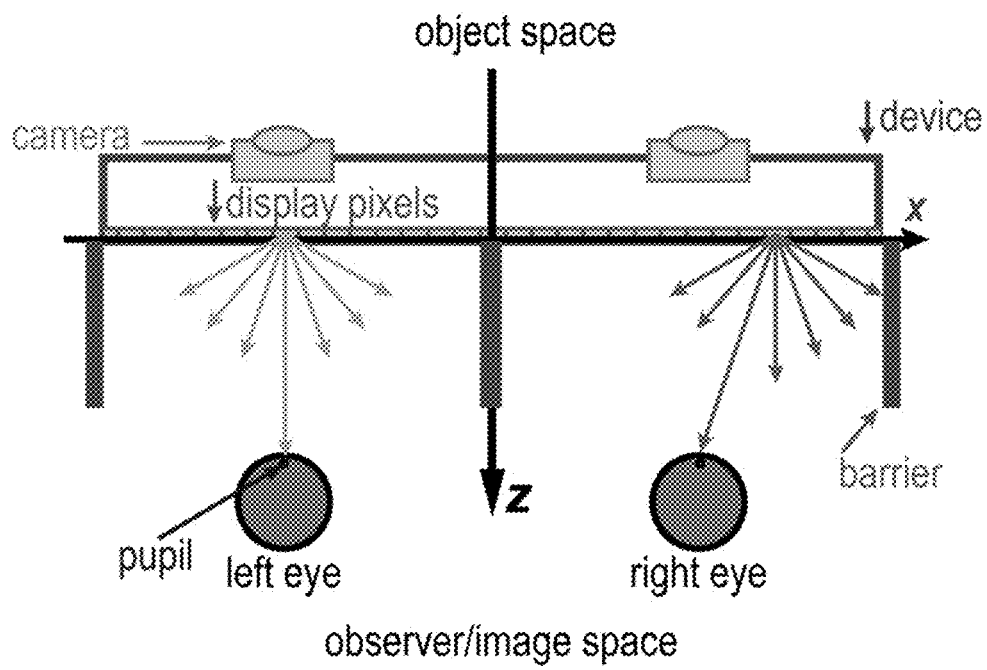

FIG. 2 is a schematic illustration of Design 2: Simple switchable VR/AR/MR for point-like pupil approximation. Images/videos captured by two cameras are displayed, such that the left (or right) camera image is seen by the left (or right) eye. Physical barriers separate left and right images, and can block unwanted rays. (Only a few example rays are drawn.)

Figure 3:
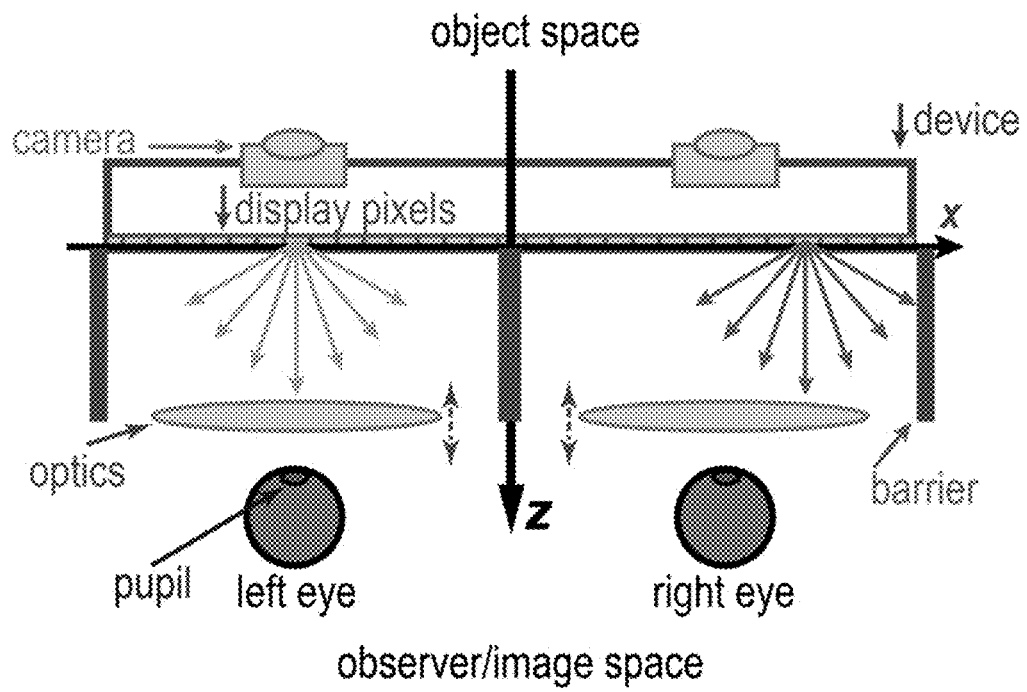

FIG. 3 is a schematic illustration of Design 3: Simple switchable VR/AR/MR with optics. Two cameras are used to capture stereoscopic images/videos that are displayed to left eye or right eye. Optics (lens(es) and/or others) can be used to make the objects from the screen appear at variable distances from the observer. For example, a lens can be placed a focal length away from the display, or at other distances so the images seen by observer appear at distances that are 'infinitely' far away, or finitely distant. Barriers can be used to block unwanted rays, of the barriers can be removed. (Only a few example rays are drawn.)

Figures 4A, 4B:
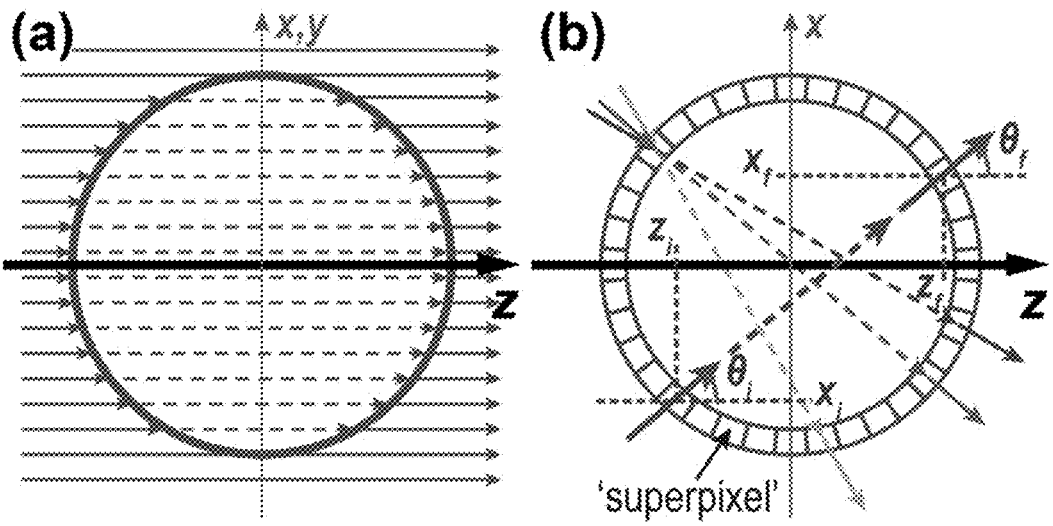

FIGS. 4(a) and 4(b) are schematic illustrations of 4(a) an ideal, spherically symmetric cloak, and 4(b) a discretized, symmetric cloak. In FIG. 4(a), example rays (solid arrows) enter and exit the cloak (circle in 2D, sphere in 3D). Dashed arrows show how the rays appear to have traveled inside the cloak (where objects are invisible). Cloak is spherically symmetric, so it works for all ray angles (omnidirectional). In FIG. 4(b), solid arrows depict some rays of light that enter and exit. The surface of the cloak is discretized, so that each 'superpixel' in space can both detect and emit multiple, discrete ray positions and angles. (Note: General, arbitrarily shaped, and even continuous cloaks follow same principles.)

FIG. 5(a) is a zoomed out portion of FIG. 5(b), which is a schematic illustration of Design 4: A device using 'digital integral cloaking.' FIG. 5(a) illustrates integral imaging detection wherein a 'superpixel,' placed at the focusing plane of a lenslet, collects rays with the same position as the lens. These rays are then spatially separated into pixels, such that one ray angle (or 'view') maps to one pixel. Display (output) is the reverse of detection scheme shown here. FIG. 5(b) illustrates a cross-section of two parallel, 2D surfaces, with a few sample rays. The input 'surface' (lens array+ plate) captures input light rays. Output surface displays rays as if they passed through ambient space only (dashed lines). For VR, AR, MR or other applications, output rays should enter the pupil(s) of the user. The center barrier can be used or removed. Detachable barriers can allow for a handheld device for these and similar designs.

Figure 6A:
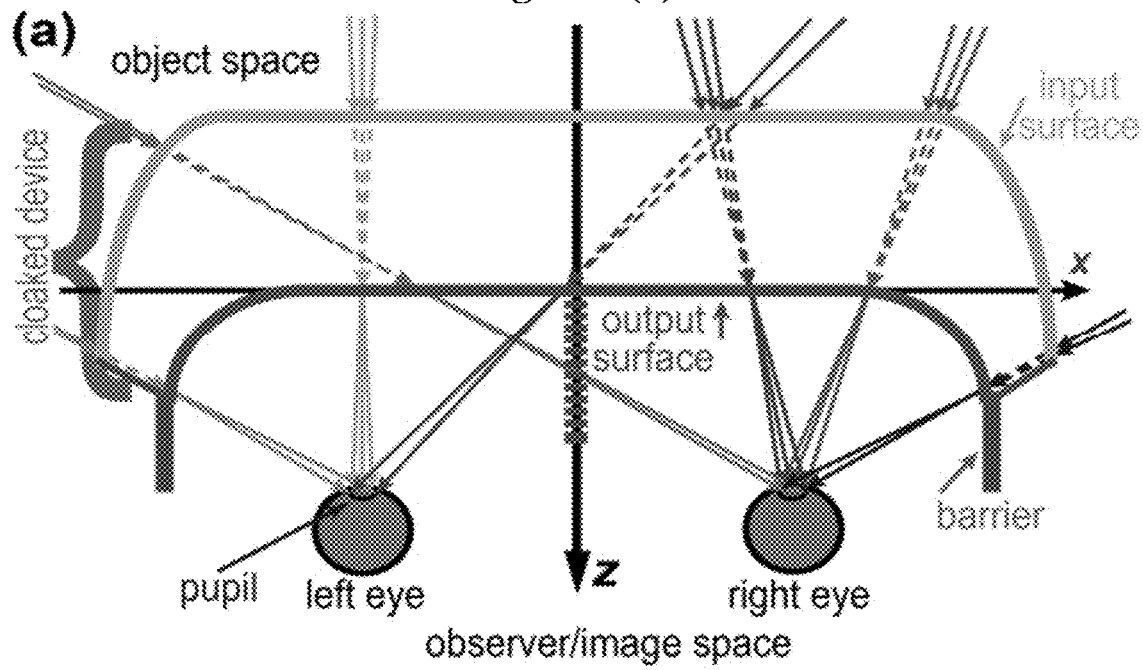
Figure 6B:
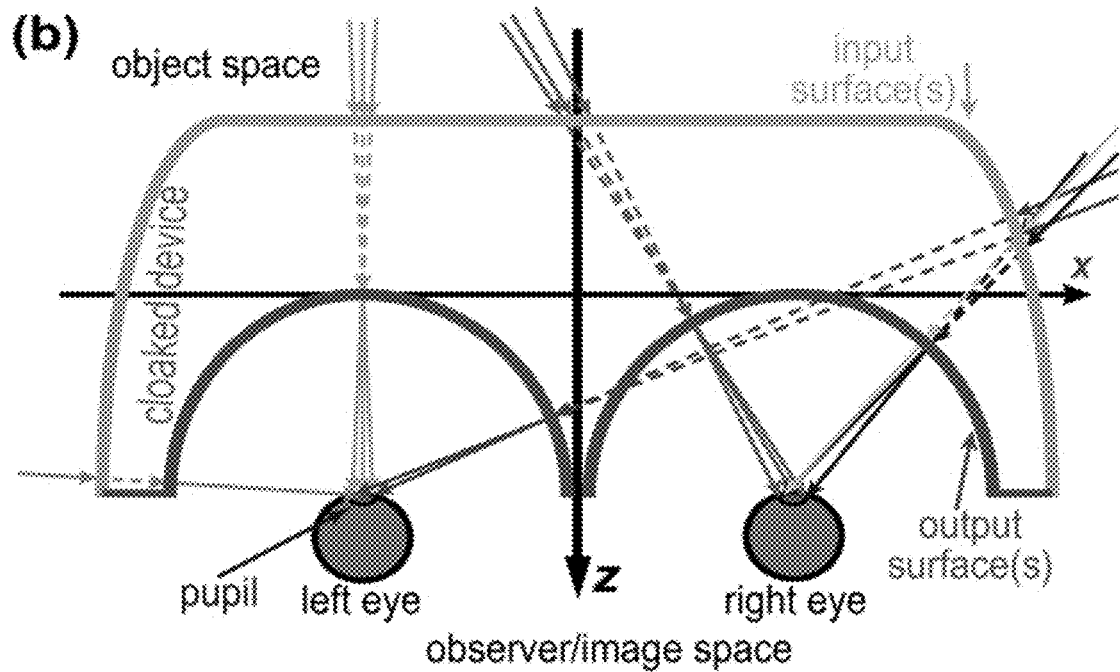

FIG. 6(a) schematically illustrates Design 5(a): Curved device using cloaking and light field. Cross-section of a curved device, with some sample rays. The input surface captures light field rays from the object space. Output surface displays light field rays as if they passed through ambient space only (in straight trajectories, shown in dashed lines). Barriers may or may not be needed, and the center barrier can be removed to allow rays to enter from left to right and vice versa. FIG. 6(b) schematically illustrates Design 5(b): Another curved device. Another design of a curved device, among many other possible variations. Cloaking and light field rays are used here. Barriers may or may not be needed.

FIG. 7(a) is a schematic illustration of Design 6(a): An example of a 'Digital Steering Device' (DSD) for light field detection and emission. Rotatable optical elements within each 'pixel' of a DSD can dynamically change the direction of light passing through it. By restricting the active area of the detector or emitter pixels, the range of angles received or output can be restricted, allowing for selective ray angles at a given point in time and space. Some rays that might make it through the setup are shown. Display (output) reverses the ray directions shown here. FIG. 7(a) is also a zoomed out portion of FIG. 7(b), which is a schematic illustration of Design 6(b): A possible switchable VR/AR/MR device using digital steering devices. Cross-section with a few sample rays, though variations include curved surfaces or arbitrary surface shapes. Both input and output surfaces use DSD's along with an array of detectors and array of display pixels, but some designs could use DSD's for one surface or a portion of the surface(s) only. The center barrier can be removed to allow ray propagation between left and right.

Figure 8A:
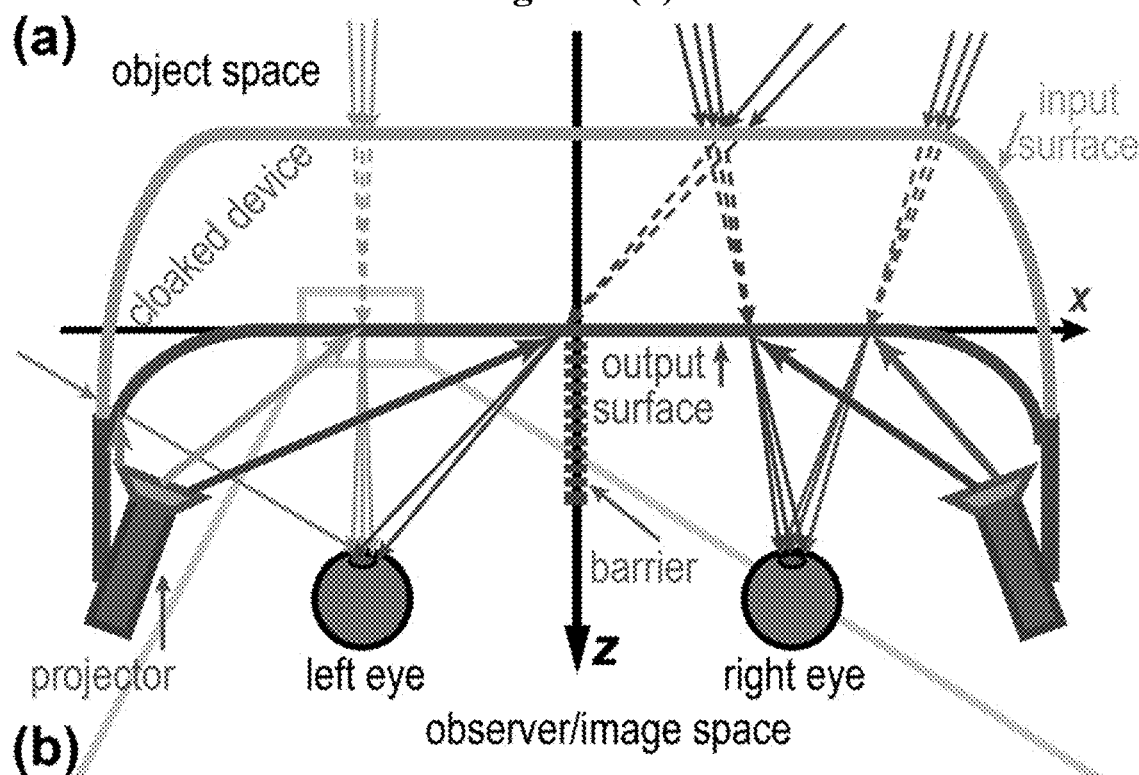
Figure 8B:
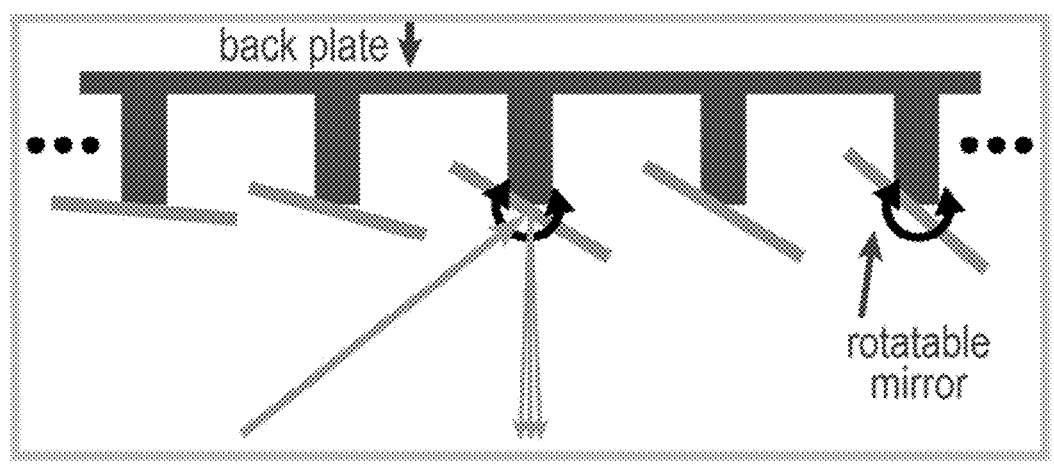

FIG. 8(a) is a schematic illustration of Design 7(a): A possible switchable VR/AR/MR device using modified Digital Micromirror Devices (mDMDs). Cross-section with a few sample rays shown. The 'input surface' collects light field rays, which are used to create the image generated by the projector(s). The output surface contains mDMDs with micromirrors that can rotate, which reflect the light field into the pupil(s) of the observer at the angle(s) determined by Equation (1). The center barrier can be removed to allow ray propagation between left and right. FIG. 8(b) is a schematic illustration of Design 7(b): Example of a modified DMD (mDMD) for light field display, and is a zoomed out portion of FIG. 8(a). The 'pixel' of an mDMD is a rotatable micromirror, which can dynamically change the direction of incident light on it by reflection. Some example rays are shown, where a light ray is incident on a micromirror and is reflected in multiple directions (continuously or discretely) over a fixed time period. At a given point in time, the resulting change in ray angle is determined by the micromirror orientation and rotation.

Figures 9A, 9B, 9C, 9D:
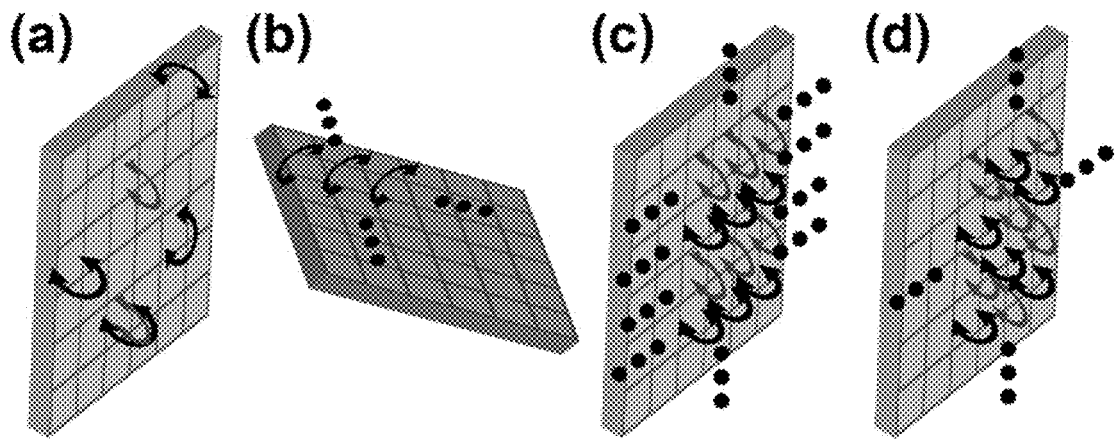

FIGS. 9(a), 9(b), 9(c), 9(d) are schematic illustrations of Designs 8: Some examples of modified Digital Micromirror Devices (mDMDs). For simplicity, rectangular micromirrors in a rectangular layout are shown, but the shapes, orientation, and layout of the mDMD pixels can vary. Rotation angles of pixels are shown in arrows, and can be continuous and/or discrete. Note that other axes of rotations are possible, not just those shown, and the patterns for the pixel rotation axes can vary from what are shown. FIG. 9(a) Individualized pixels: Each individual micromirror (mDMD pixel) can rotate about arbitrary axes (shown are some possible rotation directions), or by multiple axes, independently of other micromirrors. FIG. 9(b) Single rotation axis: All pixels rotate about the same axis. FIG. 9(c) Alternating rows: Each row of pixels rotates about the same axis. Neighboring rows rotate about orthogonal axes. The axis can alternate after multiple rows, or multiple neighboring rows can have the same rotation axis, too. FIG. 9(d) Combination patterns: Neighboring pixels may have alternating rotation axes (as shown), or some other combination of various rotation axes as the layout pattern. Pixels within small enough regions just need sufficient variety of rotations.

Figure 10:
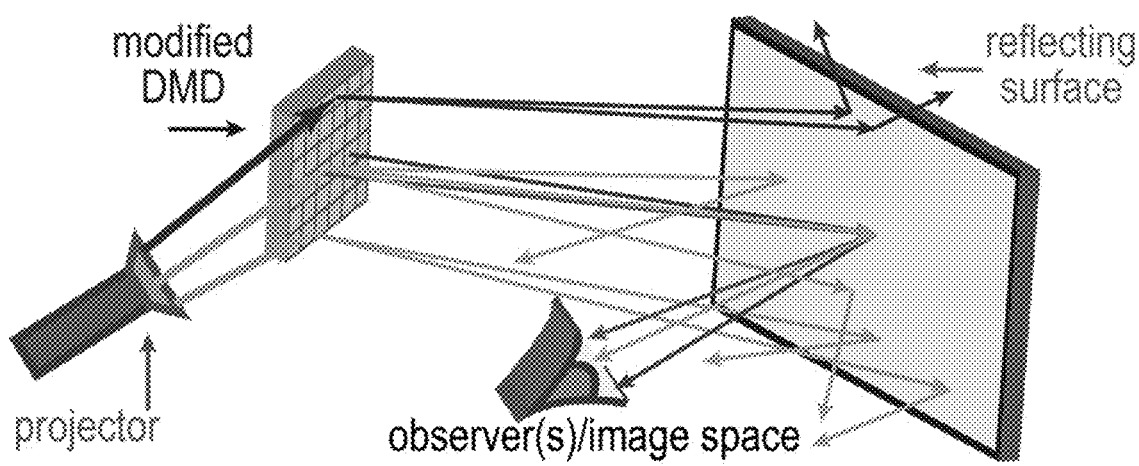

FIG. 10 is a schematic illustration of Design 9: mDMD and reflecting surface for light field display. An illuminating device such as a projector sends image(s) to the mDMD, which then reflects light field rays onto a reflecting surface. The reflecting surface, which can be large, then sends the light field rays to the observer(s) (at one or multiple positions). The mDMD pixels can rotate and thus provide multiple ray angles (over a short time) to be output from a single location (or near a region) on the reflecting surface (the projector may need to be aligned and image(s) adjusted). This can allow large screen light field display. (Some possible rays are shown, but these change depending on the combined setup.)

DETAILED DESCRIPTION

Simple Zoomed Designs

Let's first assume that the pupil of the human eye is point-like in spatial extent. Let's also assume that each display pixel generates light from a single point in space. These assumptions are not correct and are relaxed later, but will be used initially to simplify explaining some initial concepts. Then even a flat two-dimensional (2D) image from a display screen acts as a light field display. This is because only one direction of light ray is emitted from each pixel into the pupil, as there is only one ray connecting these two "points" (see FIG. 1). Thus, for small pupils and small pixels, a 2D display screen approximates a 3D light field display.

Although Design 1 (as shown in FIG. 1) may be a possibly useful VR device, when a 'virtual' image is displayed, a problem with it is that pupils are not points and actually have non-zero, finite size. This allows light rays from different pixels (and different angles) to be detected by the same point (cone or rod, for example) in the retina of the eye. Because of this 'mixing' of multiple display pixels being sensed by the same cell in the retina, the image may appear blurred.

There are some methods to alleviate this blurring. One method is to move the display screen farther from the eyes, so that each pixel subtends a smaller range of angles of light into the pupil, approximating conditions that are closer to the point-like pupil approximation. For example, the display screen can first be brought close to the eyes until the brain 'merges' the two stereoscopic images, and then the screen can be moved farther until the 3D image appears sharp enough.

Another method to reduce the blurring is to use two lenses (or optical systems), one for each eye, with each lens separated from the display screen by its focal length. This is a common method employed by VR systems, exemplified in the simple Google cardboard' VR design [4]. This then allows the display screen objects (or 'images') to appear as if located at 'infinity.' However, all objects on the display surface are located at the same position (or close to each other) in reality, despite appearing at different depths/distances from the eye due to the cues given from different left and right images that are displayed. This is a typical problem with many 3D stereoscopic images currently. This then is a cause of vergence issues and perhaps other problems for the observer, since what is perceived is different than the actual light rays that are received by the eyes.

A few simplified versions of switchable VR/AR/MR designs will now be presented based off of a point-like pupil approximation and for finite-size pupils, too. First, to reduce cross-talk, or mixing, between the left and right images displayed on the device, physical barriers that do not let light rays pass through (they could absorb light and reduce or eliminate dissipation of light into the eyes) could be used. The barriers can separate the left images and right images displayed, and can also remove any unwanted or outside light rays. This should allow easier merging of the two stereoscopic images into one 3D image by the observer, than without the barriers.

In a simplified VR/AR/MR switching design, two cameras would be placed, or adjusted, to be separated by, or close to, the interpupillary distance of the eyes. The camera centers should be in front of, or close to, the pupil centers of each eye (See FIG. 2). The images or videos of each camera would be displayed on the display pixels that are seen by the eyes, the left camera image displayed for the left eye, and similarly for the right eye. The camera settings (field-of-view, focal length, numerical aperture, etc.) can be adjusted for various effects or changes to the 'real reality' as perceived by the observer. The cameras would take dynamic images (videos) in real-time, or can simply take static images, depending on the effect desired for the "reality" shown to the observer.

The resulting background scenery as seen by the observer from Design 2 (FIG. 2), will likely be different than what the observer would see without any displays or devices. However, these two can get close to matching, albeit as a 'zoomed' view of the scenery where the observer views the scene as if his/her eyes are located closer towards the cameras. This can be done by adjusting the camera settings, display settings, display screen location and size, computational image effects, etc. In addition, the relative location and size of the screen can be changed to provide other 'zooming,' magnification, or visual effects for the observer. This works for the point-like screen pixel and point-like eye pupil approximation.

Design 2 allows for the device to capture the scenery in front of the user of the device in real-time. The 'real reality' can be captured and displayed for the user, in approximated form, or with visual effects (such as magnification, translation in space or time, etc.). This can then be combined with simulated reality using algorithms for 3D reconstruction and placement from the stereoscopic depth information and others that combine computer generated graphics or animation, allowing for an AR or MR experience. The device can be switched to a VR experience by only providing simulated reality, without the images captured by the cameras (or only using a portion of the camera images), or the two can be combined to generate a virtual world (VR, AR, MR, or a combination), too.

An advantage of a simple image capture process, as in Design 2, is that users of the device can capture images, videos, and experiences easily, and then share this with others. Others can use their devices to display or play these recordings from a different location or time from those that captured these, or even display them in real-time. The device can also capture images from moving or rotating positions of the user, to provide a wide variety of views to be shared as well. The display device does not necessarily need to have the ability to capture images, either, or vice versa. For example, one user can have a device that only captures stereoscopic images, and another user can have a device that only displays stereoscopic images, but the former can still share the captured images, and the latter can still view captured images of others or computer simulated images. The ability to quickly create and/or share content thus by users or systems can allow wide adoption of VR, AR, MR technologies.

To accommodate the finite extent of the pupil size of the eye, lenses (or other optics) can be used. The location of the optics used can be placed a focal length away from the screen, or can vary from this, which then varies, among other possible features, how far away the screen objects appear to the observer. An example of this Design 3 is shown in FIG. 3.

Cloaking Designs

For most, if not all, devices, the image capture location (for example, the locations of the camera(s) that capture the scenery ahead) is not at the same location as the location of the display pixels. This is due to the thickness of the device, or simply where the camera(s) and display pixels are located relative to each other. Because of this difference, simply projecting the images captured by the input (camera(s)) onto the output (display screen) will generate a misalignment in the position and appearance of what is displayed (and hence observed) compared to the real reality (as what the observer would see when the device is removed). To solve for this, and to properly recreate the real reality, the device must appear as if it is not present to the observer. The device should be cloaked to be 'invisible,' or transparent. In addition, to properly account for the non-zero, finite size of the observer pupil, light field rays should be both captured and displayed to different points of the pupil, or to different positions of the retina of the observer. By utilizing invisibility cloaking 'technology' [8-11], we can solve these two issues. Thus a switchable VR and AR/MR device, or other 3D display devices, can be made. We can achieve this by 'cloaking' the device, or parts of it, to make it transparent, by collecting light rays and properly displaying them. The captured light rays can be combined with algorithms and graphics onto the display, with similar effects as in an AR/MR device. Again, a complete virtual world can be displayed (a VR device) by only displaying a virtual world on the display, or a mix of real reality with simulated reality can be displayed (an AR or MR device). This then provides a switchable VR, AR, MR device, since computer simulated images (generated by the device or processor) can be combined, or not, with the light rays that are collected and displayed from the real world.

There are many methods to capture and recreate light field rays. Regardless of how rays are captured or displayed, one key for proper recreation of real reality for a device is to apply cloaking calculations as provided in References [10-13]. The calculations for cloaking simply require that for each 'input' ray of light incident on the device (or at a point of the device surface), an 'output' ray of light should exit the device such that it appears to have traveled in a straight line from the input ray, with the same direction. This must be done for all rays of light to achieve omnidirectional cloaking, but can be done for some of the light rays to achieve cloaking partially in space and/or angles. This allows the device to become cloaked, and hence transparent to the observer, within the design limits for which it is built.

As an example, FIG. 4(a) shows some rays for a spherically shaped, or circularly shaped cloaking device, but this principle applies to arbitrary shapes. For ease of understanding, we can discretize space so that the surface is composed of 'superpixels' as shown in FIG. 4(b). We can quantify the mapping of input ray to output ray, though the same calculations apply for continuous space that is not discretized. Given a transverse position $x_1$, angle $\theta_i$, and longitudinal position z, of the input ray (see FIG. 4(b)), the output ray is given by (with same variable names but with subfix 'f'):

$$\begin{bmatrix} x_f \\ \tan\theta_f \end{bmatrix}_{z=z_f} = \begin{bmatrix} 1 & (z_f - z_i) \\ 0 & 1 \end{bmatrix} \cdot \begin{bmatrix} x_i \\ \tan\theta_i \end{bmatrix}_{z=z_i} \quad \#(1)$$

We have assumed rotational symmetry about the center axis (z), though the propagation through arbitrary shapes without rotational symmetry are easily derived from Equation (1). Note that $L=(z_f-z_i)$ is constant for the planar cloak in FIG. 5(b).

Design 4 in FIG. 5 shows an example of using digital integral cloaking [11] for a VR/AR/MR switchable device. The design shows only the x-z dimension, but the principles are the same for the other (y-z) dimension, too. For simplicity, the design uses input surfaces (which collects input light rays) and output surfaces (which emits/displays output light rays) that are parallel and straight. However, for arbitrary surface shapes, Equation (1) can be used so that the rays appear to propagate through the device in a straight line. The center barrier can be used to prevent cross talk between left and right images, if desired. However, it can also be removed to allow rays from the right side to enter the left side, and vice versa.

For Design 4 or similar ones, if all of the output surface is to be utilized, then the size of the input surface will have to be large enough to collect sufficient rays of light for, and near, the edges of the output surface. For example, for the straight, parallel surfaces design shown in FIG. 5(b), assuming that the width covered by the output display pixels is $W_d$, then in the same x-z plane, the total width covered by the input pixels must be at least $W_c=(W_d+2 \cdot L \cdot \tan(FOV_l/2))$ wide, with at least ($L \cdot \tan(FOV_l/2)$) longer width than the output width on each side. Here, $FOV_l$ is the field-of-view of the output/display system (likely the largest field-of-view of the output lenslets that are relevant for, or near, the ends of the input surface, or the designed field-of-view of the device for the user, or somewhere between).

The barriers can be used to also separate the eye(s) from the display screen at a fixed (or adjustable) distance, for optimized viewing for the design. Other distance separation pieces, different than the barriers may also be used for this purpose. In addition, for Design 4 and other designs with barriers or distance separation pieces, one or more of these can be removed, and they can be detachable. Allowing these to be detachable will allow users to use the device as a handheld device without additional attachments. This can become convenient if the user can view the 3D image(s) without additional assistance, which may happen after using the barriers or distance separation pieces multiple times.

In addition, for Design 4 and other designs with light field displays, to reduce hardware requirements, one part of the display screen can be limited to sending output light fields to at least one eye pupil but not necessarily to the other eye pupil for the designed application, and the other part of the display screen can be limited to sending light fields to at least the other eye pupil but not necessarily to the one eye pupil for the designed application. For example, the left side of the output display in Design 4 could be limited to ray angles that enter the designed left eye pupil, while the right side of the display could be limited to ray angles that enter the designed right eye pupil (some regions in between might send to both pupils, but they do not need to do so). Or, the display screen could send output light fields limited to both eye pupils only for the designed application, rather than in between or outside of the designed pupils. For example, one output superpixel in Design 4 could be limited to ray angles that enter the designed left eye pupil, while a near neighboring superpixel could be limited to ray angles that enter the designed right eye pupil. To optimize hardware resource distribution further, a portion of the display screen can send higher resolution (than other regions) light field rays to a central region of the eye pupil(s) for the designed application, whereas other portion(s) of the display can send lower resolution (than those that enter the central foveal region of the pupil(s)) light fields to the non-central regions of the eye pupil(s). These can be limited to one eye pupil at a time or to both eye pupils. For example, the output (display) superpixels directly ahead of each pupil in Design 4 may have higher concentration of pixels within each superpixel to create more angles than the superpixels in the outer regions, and/or may have smaller superpixel sizes than the other regions to increase spatial resolution for the foveal region of the pupil(s). In addition, the input surface can be adjusted in these cases to collect only those rays necessary for the display output surface, or close to these sets of input rays. Of course, it is possible to not place these restrictions and have the display screen send output light fields to multiple points throughout the output (displayed) field-of-view for the designed application, not just into the designed eye pupil(s). Also note that these designs apply to devices that use other light field capture or display methods, not just that using lenslet arrays or integral imaging techniques.

It is worth discussing design optimization for light field devices. When using light field rays to output into the pupil(s) of observers (which include, but are not limited to, Design 4), light rays that would not enter the pupils are not necessary to output. Utilizing this fact can reduce input power requirements, pixel density and/or light field resolution requirements, and computational resources, and can provide other benefits. In fact, since the foveal region, or central vision, is the sharpest for humans, the distribution of resources (pixels, lenslets, other light field components, computing power, etc.) can be focused for the central region of the output and input surfaces (for example, fewer ray angles can be generated for the edges of the field-of-view). Also, most users will likely move and/or rotate their head and/or body, more so than how much they rotate or move their eyes, to view regions outside of the center area of the field-of-view. So the user experience can still be good even if the outer region of the field-of-view has lower resolution (spatially, and/or for angles) than the central/foveal region of the viewer, by generating high resolution (angular and/or spatial) images/videos in the central region that changes to match the view of the user as he/she moves his/her head and/or body. This can also be aided by computational imaging, interpolation, and calculations. These then can further improve the cost and design of such light field devices, including that for switchable VR/AR/MR devices.

To make a device work for as many users as possible, with varying interpupillary distances, pupil sizes and locations, individual eye movements and rotations, and for varying lighting conditions (which also changes the pupil sizes), the design of a device can be made to work for a large enough pupil size that encompasses all these variations that the design would like to include. Then the output light field rays can be limited such that only those that enter through the pupil, for all pupil sizes, locations, movements, and rotations for the design, are calculated and/or generated. Of course even those output rays outside of this range can be included, but may not be used. In addition, there may be a need to adjust pixels (density, size, etc.), optics (focal length, size, surface, number of elements, types, optical design, etc.), distances, locations, orientation and other parameters, to optimize or match observer pupil size and location, along with desired design requirements for the device.

There are other designs that can be useful for VR, AR, MR and other usages. To simplify the illustrations, the specific methods for input and output will not be included, but these may include various light field ray methods, 3D collection and display methods, or others. For example, we can assume that light field ray collection is performed on the input surface, and light field rays are emitted on the output surface, through detectors and display pixels and lenslet arrays, through microlenslet arrays [14], through diffractive optics, through holographic elements, through parallax barrier techniques [15], through spatial light modulators, through other methods, or by any combination of these methods. These methods can be applied to light field designs shown so far, and designs that will be presented, and variations of these.

Some other designs are illustrated in FIGS. 6(a) and 6(b). Designs 5(a) (FIGS. 6(a)) and 5(b) (FIG. 6(b)) show cross-sections of devices with curved surfaces, but these easily extend to arbitrary surfaces, including those that do not necessarily require x, y symmetry. For VR, AR, MR or other applications, output rays enter the pupil(s) of the user. In addition, to optimize cost or resources, increased light field rays can be devoted to the central region that affects the foveal region of vision, while fewer light rays are generated for the outer regions of the field-of-view of the design or user. As shown in Design 5(b) (FIG. 6(b)), some rays can appear to have traveled in and out of the device, to connect the output ray with its input ray (which may come from multiple locations depending on the design) in a straight trajectory. For all these designs (including Designs 1-9 and others), multiple input or output surfaces can be connected, and the shapes of the input and/or output surface(s) can have various shapes, for design variations and for varying purposes, costs, or aesthetics.

Note that devices that only collect input light rays along a line on the input surface (for example, along y=constant on the input surface of FIGS. 5 and 6), or for a limited range of x and/or y values, can still be useful for light field display for the device, for VR, AR, MR, or other purposes. This is because the range of pupil(s) positions of the eye(s) may not necessarily be large in the vertical (y) direction. Also, the eye can rotate (vertically or horizontally), but to generate views for rotation of eyes (while the pupils remain relatively in the same positions), will likely only require large enough field of view of the input detection method, not necessarily detecting light field rays for all possible vertical positions on the input surface. Thus, some useful designs can utilize cylindrical lenslets (slanted or straight) for input and/or output surfaces, parallax barriers, arrays of cameras along a line on the input surface or on a limited area of the input surface, etc. To improve the vertical and horizontal alignment and magnification, spherical lenslet arrays, "fly's eye" lenslet arrays, or various spatial light modulators can also be used. There are other methods to collect and produce the necessary light field rays, either for a limited region or for the full surfaces of the device, some of which will be discussed later.

Light Field Designs

Now, some methods to detect and generate light field rays will be presented. These methods can be applied for switchable VR/AR/MR applications, including for the designs already presented (Designs 4, 5(a) and 5(b)) and variations thereof, but also for more general 3D display applications, or other light field systems and devices. To collect light field rays, detectors combined with lenslet (cylindrical, spherical, fly's eye, or other types) arrays [16], or detectors combined with lenses and microlenslet arrays (much like Lytro [17]), parallax barriers, arrays of cameras, arrays of detectors and emitters that are similar to an array of 'pinhole' cameras or emitter (Supplementary material from Reference [11]), arrays using artificially engineered materials metamaterials), holographic or diffractive optics, or spatial light modulators and detectors can be used. For output, or emitting light field rays, the same setup can be used in reverse but with detectors replaced with display pixels/emitters.

Digital Steering Device (DSD)

In addition to the previously mentioned methods, some novel methods for light field collection and display will now be presented. First, a type of light ray steering device for digital/discretized applications could be used for light field ray collection and emission. Each discrete element, or 'pixel,' would transmit light rays but can also change the direction of (hence, steer') light rays passing through it. These devices will be called digital steering devices' (DSD's) in this work. For example, FIG. 7(a) presents one of many possible methods for such a device.

In FIG. 7(a), rotatable 'optical elements' are embedded or suspended in a substrate, with each 'pixel' of the DSD containing at least one such optical element. The optical elements can be prisms, lenses, crystals, or other materials or methods, which can change the direction of light rays that enter the DSD, dynamically and in a controlled manner. These elements in the DSD could also be mechanically rotated (about just one axis or multiple axes of rotation), electrically rotated, suspended in liquid, embedded in solid material, or placed in gas or free space. By controlling the orientation (relative direction and/or position) and/or position of these elements, light rays entering each pixel can change directions, dynamically. Each DSD pixel can be controlled individually and independently, but other layouts for them can also be useful, including those shown in FIG. 9 (the rotation axes for the pixels shown could be applied to DSD pixels instead). By combining such DSD's with detector arrays or display pixel arrays that can select limited regions in space (through physical barriers, absorptive materials, or other methods that are separate or part of the DSD and detector/emitter arrays), a narrow range of light field ray angles can be selectively detected or emitted, respectively, for each pixel or discrete region of space.

With a DSD pixel combined with one or more detector pixels or display pixels, the ray angles detected or emitted can change for different points in time, even when the spatial location or region remains fixed. Thus, with DSD's, light field ray detection and display can be performed without requiring additional pixels or space, if the switching of ray angles is performed sufficiently fast for the observer/application. Thus, trading space and time in such manner can reduce the high pixel density requirements that may be necessary in 3D integral imaging [16]) or other 3D methods. An example using DSD's for switchable VR/AR/MR is shown in FIG. 7(b). However, note that DSD's (as shown in FIG. 7(a) or in other forms) are not limited to being used as in FIG. 7(b), but can be used for other designs with arbitrary shapes, and most importantly can be applied for general light field detection and generation.

Note that what's important for the DSD's in light field applications is that the light ray directions need to be selectively limited for each discrete space (pixel), region in space, or group of pixels. Though individual control of each DSD pixels might provide the greatest freedom and control, all the pixels can send the same direction (or range of directions) of light simultaneously, or independently of each other, or groups of pixels can transmit same/similar directions at a given time. This just needs to be synchronized and calibrated with the detectors or emitters used, so at any given time and any given DSD pixel (combined with its matching detector pixel(s) or emitter pixel(s)), both the position and direction of the net resulting light ray(s) can be determined or approximated. With the light field ray information, algorithms and calculations can be used for the light field application desired. Some calibration, optimization, alignment, and adjustments of the DSD with the detector(s) or emitter(s) used in conjunction with the DSD may be necessary. These may include adjusting the separation between DSD and detector(s) or emitter(s), relative size of the active area of the pixels, barriers for absorbing or blocking unwanted rays, size and characteristic of the optical element (s) in the DSD, and others, so that the desired design specifications are met.

Modified Digital Micromirror Device (mDMD)

The micromirror pixels of current digital micromirror devices (DMDs) can switch in the kHz rate between 'on' and 'off' states, that are represented by tilting each mirror ('pixel' of the DMD) to two fixed angles (±12°, or ±17° for recent Texas Instrument models). They are typically used for binary (on or off) applications for each pixel, to generate images, videos, hard copies, spatial light modulating effects, etc. The DMD pixels are micron size mirrors that can be set to two opposite angles (representing 'on' and 'off'), or to a flat state (between the two opposite angles), by using mechanical stops, electrostatics, geometry, CMOS memory, and other elements [18-21]. Current DMD's can be modified so that each pixel, or group of pixels, can vary between a range of angles (continuously or discretely), and these rotations can be utilized to generate light field rays of various angles, for each pixel position, without taking up additional space or requiring high pixel densities (as may be needed for integral imaging).

In fact, the current form of a digital micromirror device can be 'modified,' in application and/or design, to generate light field rays with multiple angles (continuous or discrete). Combining such 'modified DMD' (mDMD) with a form of 'time-division multiplexing,' light field applications can be achieved. First, by using the two opposite angles and the flat state, 2 or 3 angles of reflection can be achieved for each DMD pixel. For example, for a DMD with ±17° as the two on and off states, and 0° for the flat state, all 3 of these angles can be used, or the pairs (17°,−17°), (17°,0°), (−17°, 0°) can be used. These then can generate up to 3 discrete light field ray angles for each pixel. Then, by cycling these rotation angle states of the DMD quickly, with images projected onto the DMD from a projector just as quickly (synchronized with the DMD state changes), light field rays with up to 3 'views' (or discrete angles) can be displayed (As in FIG. 8, or for general light field display systems, for example). The speed for these changes, if fast enough to happen within the integration time of the observer (machine, human, or others), will allow multiple ray angles from a fixed position to be observed.

In addition, even with current DMD's, 4 or more rotation angles can be used by careful 'modified' application. With a fast projector system that can project multiple images faster than the time it takes the DMD to change from one state to another (between the flat and two opposite states), then additional light field ray angles can be generated. This is done by switching the projected image while the DMD pixels change state, as the micromirrors will change the rotation angle in a continuous manner between states. This may require precise timing control of the projector image(s) and knowledge of the DMD micromirror rotation angle between states. For example, the angle change of a DMD micromirror from on to off as a function of time has a curve (which can be measured if not known), which can be used to determine when to send light pulses or different image pixels, so that the light can be reflected at the desired angle(s). In Reference [18], FIG. 14 shows such a curve, where the DMD micromirror changes from 10° ('on') to −10° ('off') in about 8 μs, and then stabilizes by 15 μs. This implies that about 4 light pulses (or image pixels) that are 2 μs long each, can be projected onto the DMD micromirror and be reflected at 4 different angles. There will be a blurring effect of the 4 ray angles since the change in DMD angles is not discrete, but for smaller light pulse (or image pixel) durations, or for a flatter curve (DMD angle change vs. time) than shown (Reference [18], FIG. 14), the reflected angles will be more precise. Also, for small light pulses, or small duration of each image, the irradiance or intensity of the light may need to be increased to appear sufficiently bright and noticeable. Note that even if all pixels do not behave uniformly, with careful measurement and calibration of each DMD micromirror pixel, as long as its rotation angle is known as a function of time and other controls (electrostatic input, biases, geometry, etc.), then the projected image(s) or pixels just needs to be sent at the correct points in time for each DMD pixel, to get the desired light field ray angles and effects.

Also, the light or image pixels projected do not have to happen simultaneously, but can be applied at the right time for a given pixel to generate the desired output angle. For example, the states of rotation for the mDMD pixels shown in FIG. 8(b) might not need to happen simultaneously, but each mDMD pixel might have the desired angle at different times. The projected image pixel(s) onto each mDMD pixel then just needs to send the light to the mDMD pixel at the time when the desired rotation angle occurs for the mDMD pixel. Note, it is also possible to use DMD's that have different on and off angles, so as to adapt for different application parameters. For example, if the observer is close to the DMD panel, then larger on/off angles might be better suited than DMD's with smaller ranges, and for observers far away from the DMD panel the opposite might be true. These are some possible 'modified DMDs' (mDMDs) that may be 'modified' in application from the currently available DMDs.

Now, let's discuss various modifications in design for the current DMD's, not just a modification in application. Both, modification in application and modification in design, are included in what we term 'modified DMD' (mDMD) in this work. The slope of the transition angles from one state to another state (on-to-off, off-to-on, on-to-flat, off-to-flat, flat-to-on, flat-to-off) for the current DMD can be designed to be flatter than current DMD designs. This will enable more light field angles to be generated with the same projector.

The total transition time should be less than the integration time of the observer, ideally, though other DMD pixels nearby could compensate for this if needed by sending other ray angles from close to the same position. Also this transition angle slope can be optimized to be as uniform as possible for all DMD pixels. The range of angles (between the 'on' and 'off' states) can be changed (increased or decreased) for different application purposes (such as distance from displayed light field rays on modified DMD to observer(s)). Also, the stabilization time for the DMD state change can be minimized to reduce any 'downtime' for the DMD pixels for generating light field ray angles.

The states of the DMD's can also be modified to have 4 or more discrete states that are quickly stabilized and are quickly changeable. This might provide more control and less blurring of ray angles than using the angles during a continuously rotating micromirror transition. When manufacturing the DMD pixels, one row of pixels can be made to rotate about a single axis, while the next row could be made to rotate about an orthogonal axis (or one close to orthogonal). This is Design 8(c), shown in FIG. 9(c). Other combinations of rotation axes can be mixed as in Design 8(d), shown in FIG. 9(d). The key is to provide sufficient variety of rotation axes for a small set of nearby DMD pixels so that all, or most of, the light field ray angles can be generated for the design by that group of DMD pixels. Other modifications and changes to the DMD designs and structures include changing the bias voltage connections on the DMD pixels so that each individual (or group of) DMD pixels can have different bias voltages that are controllable, along with different application voltages. Furthermore, the CMOS memory, electric energy structure and controls (electrostatics and/or electrodynamics), geometry, structure, and others can be redesigned so that 4 or more states of rotations (discrete or continuous) are enabled for one or more DMD pixels [18, 20]. These are some possible mDMDs that may be modified designs from the currently available DMDs.

FIG. 8 shows an example of how an mDMD can be used for switchable VR/AR/MR applications. Given an output ray into the pupil (from a given position and angle on the output surface), the correct input ray can be determined from Equation (1), by determining the input ray (position and angle) on the input surface. Then, this input ray (irradiance/intensity, color distribution, etc.) is sent to the projector, and the projector is adjusted (orientation, position, brightness, color, etc.) so that this input light is recreated and aimed at the correct output pixel (micromirror) location. The output micromirror orientation (relative direction and/or position) and rotation is adjusted so that the incident light ray is reflected and sent to the pupil with the correct output angle (the same angle with which we started, which is the angle for the ray connecting the location of the reflection on the micromirror to the location on the pupil that the output ray should enter). Although for simplicity only one input ray was discussed just now, this can happen simultaneously (or even asynchronously) with multiple rays forming an image (or partial image) that is sent from the projector, too. This shows how the input ray and output ray can be matched correctly using an input surface collecting light field rays, projector(s) that transmit rays (using, and/or modifying the input rays), and an output surface composed of mDMD pixels. Each mDMD micromirror pixel can output light field rays with one or more directions. It is important to keep in mind that these mDMDs (an example of which is shown in FIG. 8(b)) are not limited to VR, AR, and/or MR applications alone. They can be used for general light field displays.

As for the range of angles that each micromirror should rotate, this is determined by the position of the micromirror, and its relative distance and orientation from the pupil(s). This range for each mDMD pixel simply needs to be large enough so that all points of the largest pupil(s) (for the device design) can receive rays reflected from the given pixel. However, even if a small region of the pupil is covered, or only a few rays of light ray angles are generated, this can still be useful for light field display for the observer. In addition, this range of angles for an mDMD pixel can be small, and even less than the designed field-of-view of the device, since only angles for rays that would land within the designed pupil range need to be generated, which can be smaller than the total device field-of-view.

As seen in FIG. 8, the combination of projector and mDMD mirrors require adjustment and control, so that the correct light field rays are sent to the pupil(s) so as to 'cloak' the device properly. In addition, some level of synchronization, calibration, and/or alignment for both the projector and the mDMD(s) may be required for different times. For example, the projected image may have to adjust the image pixels that are projected at a given point in time, so that the correct image is sent to the mDMD layer, which will then be reflected into the pupil(s). For this to work, the mDMD pixel should have an adjusted rotation range and median tilt that depends on its location, orientation, and shape (of the micromirror and the back plate), so that the correct output ray angle is generated at that given point in time. Then at a later time, the input ray that is used for the same projector image pixel can be changed, and the mDMD pixel will have to adjust its rotation to output the correct ray angle (using Equation (1)). This process and synchronization should happen for the other pairs of input and output light field rays, and then repeat in time (in same order or other order).

Variations to Designs 7 are also possible, including using flat surfaces, arbitrary surface shapes, and a combination of multiple surfaces. Curved surfaces such as Design 7(a), Designs 5, and others, may provide an advantage over flat surfaces by allowing micromirrors to be more parallel to the back plate/panel on which they lie. However, laying such mDMDs on a curved surface might be difficult to manufacture, so flat panels of mDMDs can be tiled and connected in angles, as well. The projector(s) do not need to be from the side either, but can be placed in other locations. The projector and mDMD assembly just need to be aligned, calibrated, and set up so that the necessary output rays can be sent into the observer pupil(s). For example, a projector could be mounted from above the mDMDs, and the mDMDs could be tilted slight up so that the light rays reflected from the micromirrors can enter the pupil(s). Of course, variations to the propagation calculation (Equation (1)) and setup, both in time and space, along with computational imaging can be used to provide useful simulated effects for VR, AR, MR and other purposes, even if the device is not cloaked properly (magnification, afocality, alignment, etc. matching with real reality).

For the mDMDs to work for light field ray displays, control over each mDMD pixel independently from any other mDMD pixels (see FIG. 9(a)) may not be necessary. Also, the micromirrors may not necessarily have to rotate in all directions in 3D space. FIG. 9 shows possible layouts for mDMDs that can provide light field display, some with more control than others. Designs 8(a)-(d) (FIGS. 9(a)-(d)) show some possible layouts of micromirrors for light field display, where images can be projected onto the mDMDs, and multiple (discrete or continuous) ray angles can be output by reflection from each mDMD pixel. Designs 8(a), (c)-(d) can provide ray angles over 2π steradians of solid angle (hemisphere in space) or close to it, or even a smaller range if necessary. Depending on the device design requirements, only a small solid angle range may be necessary, reducing possible manufacturing difficulties.

Design 8(a) provides perhaps the most control, by allowing independent control of each pixel and its rotation angles. Design 8(c) shows how rows of pixels can rotate about the same axis, with nearby rows rotating about orthogonal (or nearly so) axes. Although the example illustrated in FIG. 9(c) shows the rotation axis alternating after 1 row, other variations are also possible. For example, the axis can alternate after multiple rows, with multiple neighboring rows rotating about the same axis. Also, the number of neighboring rows with the same rotation axis does not have to be fixed or constant and can change in different regions of the mDMD layout. Design 8(d) demonstrates this variation further, with each row including alternating or varying rotation axes. Again, a set of rows does not need to repeat, and can vary in the layout of rotation axis/axes for the pixels within the set as well (an arbitrary or even a random pattern of rotation axes for the pixels are possible, too). What is important for Designs 8(a), (c)-(d) is that for a small 'group' of pixels (one or more pixels), enough variation in rotations must be present so that all (or sufficiently many of) the necessary ray angles (for the design) can be generated by that group. Such groups should be distributed throughout the designed display surface. In these cases, if desired, a single image pixel (or small group of image pixels) from the projecting source can illuminate each small group, rather than illuminating a single micromirror, which might ease alignment and hardware requirements. The smaller the spatial extent of these groups, the higher the spatial resolution of the light field display. The larger the variety of ray angles produced by each group, the higher the angular resolution of the light field display for that group. Also, the location, orientation, possible rotations, etc. for each (or a large portion of them) of the mDMD pixels or of these 'small groups' must be known and controllable so that the light field rays can be controlled and generated effectively for the application.

In addition, the light or image pixels projected do not have to happen simultaneously across all mDMD pixels, but can be applied at the right time for a given pixel to generate the desired output angle. For example, rotation angles for the mDMD pixels shown in Designs 8 with the same rotation axis might not need to be the same simultaneously, but each mDMD pixel might have different angles at a given time. The projected image pixel(s) onto each mDMD pixel then just needs to send the light to the mDMD pixel at the time when the desired rotation angle occurs for the mDMD pixel. As long as the time duration to obtain all (or nearly all) the desired mDMD rotation angles is smaller than, or near, the integration time of the observer, these ray angles would then be collected by the observer for some level of light field effect.

It is important to note that even if all mDMD pixels rotate about a single axis as shown in Design 8(b), this can still prove useful for light field display. For example, multiple panels of Design 8(b) can be patched together to provide variations in light field angles (with panels at different orientations from each other, or one panel with pixels rotating in one direction and a neighboring panel with pixels rotating in a different direction, for example). Design 8(b) by itself could also be implemented on the output/display surface of Designs 1-7 or any other light field display application, with the reflected output ray angles lying on the x-z plane (the plane containing the two pupils of the observer, or simply a plane that should be optimized for a given light field display application), or close to it. This can still be useful for the cases when the pupils move along or near the x-z plane, or to at least provide light field rays for pupil spots lying along or near the x-z plane. For applications for multiple user/observer positions, Design 8(b) can provide multiple viewing angles and variations of images along this plane, as the users/observers lie or move along (or near) that plane. This may be most beneficial if the pupils, users, and/or observers do not deviate from this plane too much.

Another method for light field display, which may be useful for large display applications, is Design 9 shown in FIG. 10. An illumination system, such as a projector, can send images to an mDMD which then reflects the light field rays onto a separate reflecting surface (which can be much larger than the mDMD array size). The projector, mDMD, and reflecting surface will have to be calibrated, synchronized, aligned, and adjusted so that the light rays can be viewed effectively from the designed observer positions. For example, if the combined system of projector and mDMD send light field rays from above the reflecting screen, and the reflecting screen is located directly in front of the expected observers, then the reflecting screen may need to be tilted slightly upward so the rays are transmitted to the observer. Also, to reach the same spatial location (either a point or a small region) on the reflecting surface, but to generate a different ray angle, the projector may have to send light from a different image pixel, or the mDMD may have to use a different micromirror (or group of micromirrors), or both. In addition to other calibrations, alignment, and/or synchronization, this could require additional calculations for the image pixels sent from the projector, in coordination with the mDMD pixels from which they reflect, the angles of rotation and positions from the mDMD at the given time, and the incident and reflected angles on the reflecting surface.

The reflecting surface in Design 9 shown in FIG. 10 can be partially reflecting or completely reflecting, to achieve different effects. The reflecting surface can also be made of small surfaces that have different tilts, or the same tilt, with respect to each other, somewhat like a large mDMD array but without any dynamically changing components. Again, curved variations to both the mDMD and reflecting surface, or other patterns for laying out various rotating mDMD pixels, and/or use of multiple mDMDs can be applied for the combined system, depending on the application and design desired. Thus, Design 9 and variations of it, then can provide a method for large light field displays.

Zooming and Computational Effects

Possible zooming and computational effects will be presented. All cloaking designs, and any that capture light field rays and/or display light field rays, be it switchable VR/AR/MR devices or any other 3D capture and/or display devices, can change the distance of propagation ($(z_f-z_i)$ in Equation (1) or in FIG. 4, L in FIG. 5(b), or distance from input surface location to the output surface location) to be different than the actual physical distance between the input and output surface locations of the ray.

This then can produce a 'zooming' effect for the image displayed using such rays of light, so that the new image appears as if viewed from a location closer or farther than if the device was properly cloaked' (where ($z_f-z_i$) in Equation (1) matches the actual physical distance between input and output rays). This is also detailed in Reference [22]. The propagation distance used to generate the displayed pixel(s)

or image(s) can be dynamically controlled and changed, so that the device is not limited to showing a static/fixed zoom distance, but multiple distances, or the capability to do so (which might be done computationally and quickly). In addition, the propagation distances for each ray can be changed, not necessarily all in the same amount, to produce interesting visual effects as well that is not necessarily uniform for all pixels or rays.

The designs presented in this work have shown methods that can present images/videos in front of the observer/user, in lieu of a transparent device or set of glasses. This allows for a VR device that displays simulated reality to switch to or mix with AR/MR, by using the images/videos from the input cameras or input surfaces that collect light rays, in conjunction with a virtual world created separately or by combining with the real world. To combine real reality and simulated reality effectively, the 3D real reality may need to be reconstructed or approximated, even if partially, in 3D space. This can be done through computational algorithms that estimate the depth of various objects captured by the input cameras or input surface(s). Determination or calculation of object depths from even stereoscopic images (left and right images) should be possible, if only approximated, much like how we as humans can perceive depth from our two eyes. Additional improvements to image capture and display can be made with computational imaging, 3D mapping, depth mapping, algorithms, image interpolation, reducing issues from discretizing a continuous space, optimization, computer vision, and machine learning algorithms. In addition to algorithms, to improve the 3D reconstruction of the real world in front of the user or observers, the light field rays used (for 3D reconstruction and/or display) can be expanded to include not just those for a pair of stereoscopic images, but for those that output into a finite pupil size, or even to include the whole input surface (not just those regions that get mapped to output rays that go into the designed pupil(s)). With a 3D reconstruction of real reality (within the design specifications for the application (s)), simulated effects (through computer graphics, algorithms, calculations, etc.) can add to, subtract from, or replace the real reality, which would then compose an AR, MR, and/or VR application. If just simulated or virtual world(s) are displayed, then this would be a VR application. Thus, by switching what to show, or by combining various combinations of the real reality captured and the simulated reality generated, we can have a switchable VR, AR, MR device or more. Perhaps an important advantage of this method is the ability to utilize the whole device, a large portion of it, and/or the region directly in front of the observer's pupil(s), with display elements that do not need to be even partially transparent. This can increase the field-of-view of the device, and can reduce, or eliminate the need for material, optical elements, and/or techniques that require some transparency, since the device itself can become transparent through cloaking (or some extent of cloaking).

One important issue could be the lag in time, between image capture (by the input surface) to the display of image(s) (simulated, real, or combination). To reduce this lag, users may be advised to move their body and/or rotate their head slowly, or to capture images slowly. Concentrating sufficient computational power and speed into reducing this lag time can be helpful, too. This can include generating the real reality images (or approximations of such) first, before additional computations (other than propagating rays with Equation (1) or other 'zooming' propagations).

In addition, VR/AR/MR designs and methods described herein do not necessarily have to have both input surface and output surface simultaneously to be beneficial. The input and output surfaces can be placed on separate devices and capture or display images/videos that are separated in time and/or space. Though not necessarily a real-time, real-space switchable VR/AR/MR device, such schemes might allow users to share and view VR/AR/MR content more conveniently than requiring both input and output surfaces to be present on one device. For example, a user could capture input light field rays from a device with only light field detectors, or capture stereoscopic images with two cameras separated by some interpupillary distance. The user can then share this/these with others, including with some who might have a device that can only display (but not capture) light field rays or stereoscopic images. These captured images can be shared without modification, or modified by computer algorithms and processors before or after sharing (to another user, server, storage device, or computer). The "shared" images can even be entirely computer generated, or a combination of computer generated images with images captured by another user's input capture device. The processing of images can happen by the user's device and processor that captures the images, by a viewer's device and processor, by a separate computer processor or server or others, or a combination of these. Additionally, cloaking or zooming can be used, and other computer algorithms can be used to provide varying VR/AR/MR experiences. Thus, capturing and viewing can happen at different times, and/or at different locations, through different hardware and/or devices. Of course, a device that contains both input and output surfaces (for stereoscopic images or light field rays) can also display images not in real-time or real-space as well, or even a combination of real-time and previously captured images (by the user, a computer, or others), within the device itself or from other sources too.

In the various embodiments described herein, digital cameras or other image detector surfaces employing conventional image sensors may be employed, such as CCD sensor arrays, along with digital image displays and image projector devices employing conventional digital display elements, such as Light Emitting Diodes (LEDs), Vertical Cavity Surface-Emitting Lasers (VCSELs), microdisplays, including but not limited to liquid crystal displays, either reflective or transmissive displays, and Organic Light-Emitting Diode (OLEDs).

The switchable VR/AR/MR display devices described herein more particularly may be head mounted display devices, further comprising a frame for mounting the digital cameras or image detecting surfaces and the digital image display on the head of a user of the device. The switchable VR/AR/MR display devices will further typically comprise a computer microprocessor for processing the detected image data for display on the digital display device, along with conventional computer memory storage and power supply components. Such additional components may be incorporated into or otherwise mounted on the frame of a head mounted display device as is conventional in the art. In more specific embodiments, the switchable VR/AR/MR display devices and other devices described herein may further comprise various computer programming instructions stored in computer memory and operable for providing the described functions, such as programming for performing digitally cloaking of the device to the eyes of a user of the device, such that input reality image light field rays captured by the detector surface are converted to output light field rays displayed by the digital image display which appear to a user of the device to have travelled in straight lines from the input reality image light field rays, e.g. by employing the mathematical algorithms described herein.

In various embodiments described herein, Design 3 may more specifically include 2 cameras to collect stereoscopic input images, one or more display screen(s) to display the two images, and one or more optics for each eye that can be adjusted in distance from the eye, with removable barriers.

In further embodiments described herein, detachable barriers, or detachable distance separators (to separate eye(s) from display screen at optimal distance for design) may be included with any of the described devices, and in particular, to the VR/AR/MR devices with light field displays. Such removable character allows for the VR/AR/MR device to be handheld easily.

In further embodiments of a switchable (or cloakable) light field display VR/AR/MR device as described, one part of the display screen may send output light fields to at least one eye pupil but not necessarily to the other pupil for the designed application, and similarly for the other part of the display screen.

In further embodiments of a switchable (or cloakable) light field display VR/AR/MR device as described, the display screen may send output light fields limited to both eye pupils for the designed application.

In further embodiments of a switchable (or cloakable) light field display VR/AR/MR device as described, a portion of the display screen may send higher resolution light field rays to the central region of the eye pupil(s) of a user of the device for the designed application, whereas other portion(s) of the display sends lower resolution light fields to the non-central regions of the eye pupil(s).

In further embodiments described herein, the input surface(s) can be adjusted to collect only those rays necessary for the display output surface, or close to the required input rays.

In further embodiments of a switchable (or cloakable) light field display VR/AR/MR device as described, the display screen may send output light fields to multiple points throughout the output (displayed) field-of-view for the designed application.

In this work, various methods and designs for switchable VR, AR, MR devices have been given. These, and variations of them, can be applied to displaying real reality, simulated reality, or combinations of such with/without additional computational effects. A key element for many of these devices is to recreate, or approximate, the light field rays that would be observed by the user without the device, and combine with simulated reality and effects if desired. Cloaking techniques can be used to help make this possible. In addition, novel methods for 3D light field capture and generation have been described, which have applications beyond VR, AR, MR, and can generally be applied for 3D light field applications.

The references cited above are as follows. The disclosures of these references are hereby incorporated herein by reference in their entireties.

[1] K. Kelly, Wired, "The Untold Story of Magic Leap, the World's Most Secretive Startup," (May, 2016).
[2] O. Cakmakci and J. Rolland, Journal of Display Technology 2, 199 (2006).
[3] B. Kress and T. Starner, Proc. of SPIE, p. 87200A (2013).
[4] Google, "Google cardboard manufacturers kit," (2015).
[5] J. E. Greivenkamp, Field guide to geometrical optics, Vol. FG01 (SPIE, Bellingham, Wash., USA, 2004).
[6] E. Y. Lam, Journal of the Optical Society of America A 32, 2021 (2015).
[7] G. Wetzstein, I. Ihrke, D. Lanman, W. Heidrich, K. Akeley, and R. Raskar, in ACM SIG-GRAPH (ACM SIGGRAPH Course Notes, 2012).
[8] J. B. Pendry, D. Schurig, and D. R. Smith, Science 312, 1780 (2006).
[9] U. Leonhardt, Science 312, 1777 (2006).
[10] J. S. Choi and J. C. Howell, Optics Express 22, 29465 (2014).
[11] J. S. Choi and J. C. Howell, Optica 3, 536 (2016).
[12] J. S. Choi and J. C. Howell, "Paraxial cloak design and device," U.S. Utility patent application Ser. No. 14/714,671, May 18, 2015; U.S. Pat. Pub. No. 2016/0025956 A1.
[13] J. C. Howell and J. S. Choi, "Cloaking systems and methods," PCT Application PCT/US2016/028665, Apr. 21, 2016.
[14] D. Lanman and D. Luebke, ACM Transactions on Graphics 32, 220 (2013).
[15] S.-U. Kim, J. Kim, J.-H. Suh, J.-H. Na, and S.-D. Lee, Optics Express 24, 25010 (2016).
[16] Scientific American 105, 164 (1911).
[17] R. Ng, M. Levoy, M. Bredif, G. Duval, M. Horowitz, and P. Hanrahan, Stanford University Computer Science Tech Report CSTR 2005-02 (2005).
[18] L. J. Hornbeck, in Micromachining and Microfabrication Process Technology, Vol. 2639 (Proceedings SPIE, 1995) p. 2.
[19] D. M. Monk and R. O. Gale, Microelectronic Engineering 27, 489 (1995).
[20] DMD 101: Introduction to Digital Micromirror Device (DMD) Technology, Application Report (Texas Instruments, 2013).
[21] C. Gong, ECS Transactions 60, 1141 (2014).
[22] J. S. Choi and J. C. Howell, "3D display ray principles and methods, zooming, and real-time demonstration," U.S. Provisional Patent Application 62/378,016, Aug. 22, 2016.

The invention claimed is:

1. A switchable VR/AR/MR display device, comprising two digital cameras positioned for detecting left and right stereoscopic reality images, and a digital image display positioned for displaying the detected left and right stereoscopic reality images to the left and right eyes of a user of the device;
    further comprising a physical barrier positioned to prevent left and right eye stereoscopic images displayed on the digital image display from being seen by the opposite eye of a user of the device; and wherein the physical barrier is detachable from the device.

2. The switchable VR/AR/MR display device of claim 1, further comprising optical elements positioned to adjust the focal point of an image displayed on the digital image display relative to the eyes of a user of the device.

3. The switchable VR/AR/MR display device of claim 1, wherein the two cameras are placed, or are adjustable, to be separated by approximately the interpupillary distance of the eyes of a user of the device.

4. The switchable VR/AR/MR display device of claim 1, wherein reality images detected by the digital cameras are combinable with simulated images for display on the digital image display to the eyes of a user of the device.

5. A switchable VR/AR/MR display device according to claim 1, wherein the device is a head mounted display device further comprising a frame for mounting the digital cameras and digital image display on the head of a user of the device.

6. A switchable VR/AR/MR light field display device, comprising a light field ray detector surface positioned for capturing reality image light field rays, and a digital image display positioned for displaying light field rays corresponding to the captured reality image light field rays to the eyes of a user of the device;

further comprising computer programming instructions stored in memory and operable for digitally cloaking the device to the eyes of a user of the device, such that input reality image light field rays captured by the detector surface are converted to output light field rays displayed by the digital image display which appear to a user of the device to have travelled in straight lines from the input reality image light field rays; and further comprising controllable rotatable optical elements for sequentially steering reality image light field rays from multiple different angles to same individual detectors of the detector surface, and computer programming instructions stored in memory and operable for combining detected light from different angles to obtain a temporally integrated light field.

7. A switchable VR/AR/MR light field display device of claim 6, wherein the light field ray detector surface and the digital image display comprise generally planar surfaces.

8. A switchable VR/AR/MR light field display device of claim 6, wherein at least one of the light field ray detector surface and the digital image display comprises a curved surface.

9. A switchable VR/AR/MR light field display device of claim 6, wherein each of the light field ray detector surface and the digital image display comprises a curved surface.

10. A switchable VR/AR/MR light field display device, comprising a light field ray detector surface positioned for capturing reality image light field rays, and a digital image display positioned for displaying light field rays corresponding to the captured reality image light field rays to the eyes of a user of the device;

further comprising computer programming instructions stored in memory and operable for digitally cloaking the device to the eyes of a user of the device, such that input reality image light field rays captured by the detector surface are converted to output light field rays displayed by the digital image display which appear to a user of the device to have travelled in straight lines from the input reality image light field rays; and wherein the light field ray detector surface is configured to collect only those reality image light field rays necessary for display on the digital image display.

11. A switchable VR/AR/MR light field display device of claim 10, wherein at least one of the light field ray detector surface and the digital image display comprises a lenslet array.

12. A switchable VR/AR/MR light field display device, comprising a light field ray detector surface positioned for capturing reality image light field rays, and a digital image display positioned for displaying light field rays corresponding to the captured reality image light field rays to the eyes of a user of the device;

further comprising computer programming instructions stored in memory and operable for digitally cloaking the device to the eyes of a user of the device, such that input reality image light field rays captured by the detector surface are converted to output light field rays displayed by the digital image display which appear to a user of the device to have travelled in straight lines from the input reality image light field rays; and wherein the digital image display further comprises controllable rotatable optical elements for sequentially steering display image light field rays in multiple different angles from individual pixels of the digital image display for projecting a temporally integrated light field to the eyes of a user of the device.

13. A switchable VR/AR/MR light field display device, comprising a light field ray detector surface positioned for capturing reality image light field rays, and a digital image display positioned for displaying light field rays corresponding to the captured reality image light field rays to the eyes of a user of the device;

further comprising computer programming instructions stored in memory and operable for digitally cloaking the device to the eyes of a user of the device, such that input reality image light field rays captured by the detector surface are converted to output light field rays displayed by the digital image display which appear to a user of the device to have travelled in straight lines from the input reality image light field rays; and further comprising at least one digital image projector and wherein the digital image display comprises digital micromirror devices with controllable pixels for sequentially reflecting light from the digital image projector at multiple different angles from individual pixels for projecting a temporally integrated light field to the eyes of a user of the device.

14. A switchable VR/AR/MR light field display device of claim 12, wherein a portion of the digital image display sends higher resolution light field rays to the central region of an eye pupil of a user of the device, and another portion of the digital image display sends lower resolution light fields to non-central regions of an eye pupil of a user of the device.

15. A switchable VR/AR/MR light field display device of claim 12, wherein the digital image display sends output light fields to multiple points throughout the displayed field-of-view.

16. A switchable VR/AR/MR light field display device of claim 6, wherein the device is a head mounted display device further comprising a frame for mounting the light field ray detector surface and digital image display on the head of a user of the device.

17. A switchable VR/AR/MR light field display device of claim 12, wherein the device is a head mounted display device further comprising a frame for mounting the light field ray detector surface and digital image display on the head of a user of the device.

18. A switchable VR/AR/MR light field display device of claim 13, wherein the device is a head mounted display device further comprising a frame for mounting the light field ray detector surface and digital image display on the head of a user of the device.

19. A switchable VR/AR/MR light field display device of claim 10 wherein the device is a head mounted display device further comprising a frame for mounting the light field ray detector surface and digital image display on the head of a user of the device.

* * * * *